United States Patent [19]

Bourret

[11] Patent Number: 4,899,610

[45] Date of Patent: Feb. 13, 1990

[54] THROTTLE LEVER

[75] Inventor: Michel Bourret, Drummondville, Canada

[73] Assignee: Bombardier Inc., Canada

[21] Appl. No.: 250,266

[22] Filed: Sep. 28, 1988

[51] Int. Cl.[4] .................. G05G 11/00; G05G 5/06
[52] U.S. Cl. .......................... 74/489; 74/526; 74/502.2; 188/136 BA; 188/2 D; 188/24.11
[58] Field of Search ............. 74/489, 526, 523, 501 R, 74/488, 522, 502.2, 551.9, 571 M, 532, 528, 473; 188/196 BA, 265, 2 D, 24.11, 24.12, 24.13, 24.14, 24.21, 24.22; 192/111 A, 85 R, 99 S, 110 R

[56] References Cited

U.S. PATENT DOCUMENTS

| | | | |
|---|---|---|---|
| 2,824,463 | 2/1958 | Gleasman et al. | 74/489 |
| 3,446,091 | 5/1969 | Stocker | 74/513 |
| 3,948,361 | 4/1976 | Carlson | 188/265 X |
| 4,005,613 | 2/1977 | Kaufman et al. | 74/489 |
| 4,429,589 | 2/1984 | Stocker . | |
| 4,517,856 | 5/1985 | Schafer et al. | 74/528 |
| 4,532,825 | 8/1985 | Nagano | 74/532 |
| 4,611,500 | 9/1986 | Nagano | 74/571 M X |

FOREIGN PATENT DOCUMENTS

| | | | |
|---|---|---|---|
| 1010344 | 5/1977 | Canada . | |
| 1210326 | 3/1960 | France | 74/489 |
| WO87/05576 | 9/1987 | PCT Int'l Appl. | 74/489 |
| 127016 | 12/1949 | Sweden | 74/489 |
| 649552 | 1/1951 | United Kingdom | 74/489 |
| 878684 | 10/1961 | United Kingdom | 74/473 |

Primary Examiner—Vinh Luong
Attorney, Agent, or Firm—Larson and Taylor

[57] ABSTRACT

A throttle control lever for a vehicle, and in particular for a recreational vehicle such as a snowmobile, has a two-stage lever action. In the first stage, which includes throttle openings corresponding to normal cruising speeds of the vehicle, the throttle lever turns about a first pivot axis wherein the mechanical advantage of the manual actuating force is relatively high. In a second range the throttle lever pivots about a second pivot axis wherein the mechanical advantage of the manual actuating force is relatively much smaller. Operator fatigue is reduced because of the reduction in force required at normal cruising speeds of the vehicle.

11 Claims, 2 Drawing Sheets

THROTTLE LEVER

BACKGROUND OF THE INVENTION (a) Field of the Invention

This invention relates to a new or improved throttle lever designed to provided improved throttle control characteristics. The improved throttle lever is particularly suitable for use in recreational vehicles such as snowmobiles.

(b) Description of the Prior Art

The throttle opening of a snowmobile engine is typically controlled through a flexible bowden cable from a throttle lever that is pivotally mounted on the handlebars of the snowmobile adjacent the handgrip so that the throttle lever can be manipulated by the thumb of a hand whose fingers are wrapped around the handgrip. The throttle lever is moved against the spring return force of the throttle element in the engine to open the throttle to the desired degree, the force required usually increasing linearly with the distance through which the throttle lever has been moved. The throttle return spring must provide sufficient force to return the throttle element to the closed position when released under all normal operating conditions. Since in snowmobiles such normal conditions include icing conditions, it is necessary to use a comparatively strong spring force and as a result, in periods of prolonged operation of a vehicle, the operator's hand is subject to fatigue in holding the throttle lever in its opened condition.

SUMMARY OF THE INVENTION

The object of the present invention is to provide a throttle control mechanism that will reduce operator fatigue. The invention is based upon the appreciation that it would be desirable to re-design the load characteristics of the throttle mechanism to require a lower force to be applied by the operator during the normal operating range of the throttle lever even at the expense of a much greater force being required at high throttle openings. The inventor realized that such greater forces would not fatigue the driver since in typical operation they would only have to be applied for relatively short intermittent periods.

Accordingly, the invention provides in a vehicle having a steering mechanism that includes handlebars terminating in handgrips for engagement by the driver's hands, a throttle lever being pivotally mounted on the handlebars and spring loaded towards a closed position, said throttle lever being located adjacent one said handgrip such that when said one handgrip is grasped by the corresponding hand of the driver the thumb of that hand is in position to manipulate the throttle lever away from said closed position and thus control operation of the vehicle engine, the improvement comprising: said throttle lever being adapted to perform a two stage pivotal movement about respective spaced first and second pivot axes that are so located that during a first stage of pivotal movement of said throttle lever about said first axis away from the closed position an actuating force applied by the driver's thumb acts at a greater mechanical advantage than during a second stage of pivotal movement thereof about said second axis.

The two pivot axes may be provided by pins that are mounted on a carrier that is fixedly secured to the handlebars, the pins preferably being received in respective first and second elongate arcuate slots formed in the throttle lever, the second slot being arcuately curved about one end of the first slot and vice versa such that in the closed position of the throttle lever the first pin is located at said one end of the first slot and the second pin is located at the other end of the second slot. With this arrangement the first stage of pivotal movement occurs about the first pin and terminates when said one end of the second slot is brought into engagement with said second pin whereupon the second stage of pivotal movement can commence. Preferably the dimensions are so selected that the mechanical advantage of the operator's thumb acting on the throttle lever is at least twice as high during the first stage of pivotal movement as during the second stage so that at the transition between these stages there is an abrupt change in the resistance, which is readily perceived by the driver.

BRIEF DESCRIPTION OF THE DRAWINGS

The invention will further be described, by way of example only, with reference to the accompanying drawings wherein:

Referring to FIG. 1, the snowmobile 11 is supported at its rear end on an engine-droven track 12, and at its front end on a pair of steerable skis 13 which are controlled by handlebars 14 to be engaged by the driver of the vehicle.

Figure 1:
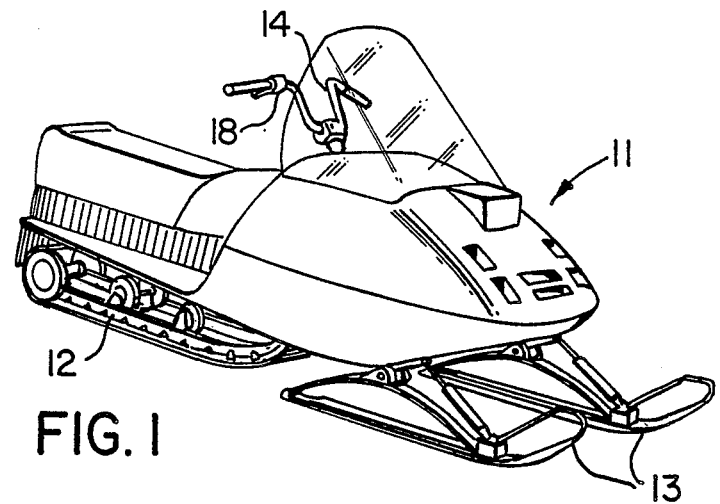
FIG. 1 is a perspective view of a snowmobile that embodies the improved throttle control mechanism according to the invention.
Figure 2:
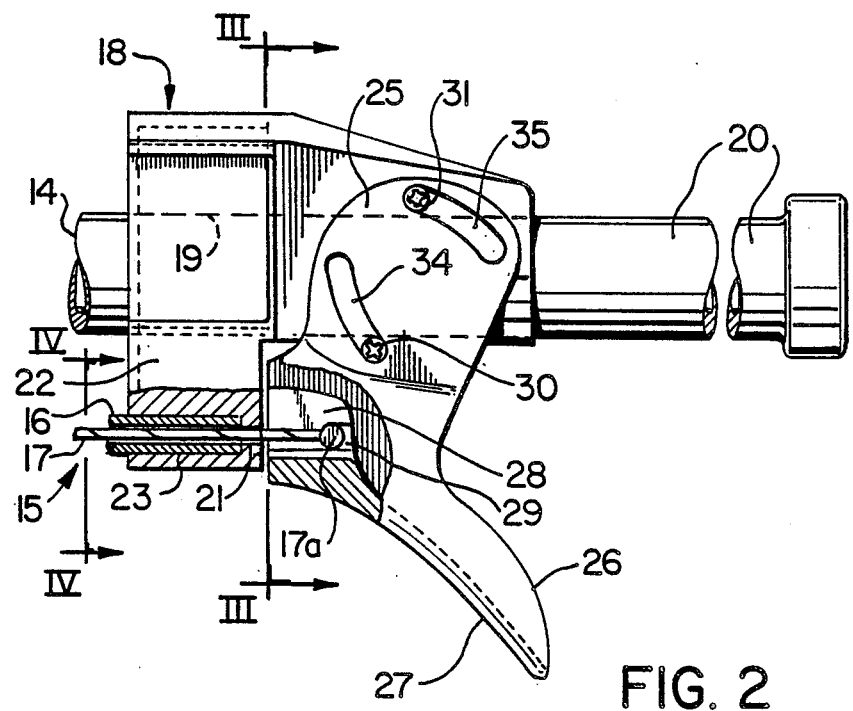
FIG. 2 is a large fragmentary partially sectioned view of a throttle control lever mounted adjacent one end of the handle bar of the snowmobile.

Fuel supply to the engine (not shown) is conventionally controlled by a throttle element in the form of a carburetor or fuel injection pump that is in turn actuated through a flexible bowden cable 15 (FIG. 2). The bowden cable 15 comprises a tubular sheath 16 that its substantially non-compressible in its length direction, and a stranded wire core 17.

Figure 3:
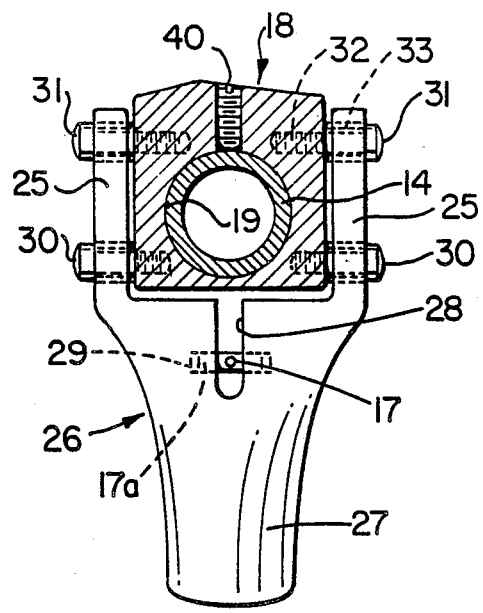
FIG. 3 is a sectional view taken on the line III—III in FIG. 2.
Figure 4:
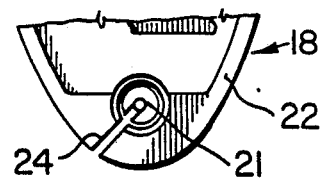
FIG. 4 is a fragmentary sectional view taken on the line IV—IV in FIG. 2.

As shown in FIGS. 2 and 3, a mounting bracket 18 having a cylindrical bore 19 is received over the tubular handlebars 14 and secured thereto by any suitable means such as clamping screw means 40 in a position adjacent the handgrip 20 at the right hand terminal end of the handlebars.

The core 17 of the bowden cable 15 passes through a bore 21 in an extension 22 of the mounting bracket 18, there being an adjacent counterbore 23 which receives and forms a seat for the end of the sheath 16 of the bowden cable. As seen in FIG. 3, there is a narrow radial slot 24 that communicates with the entire length of the bore 21 and counterbore 23, this slot being of a width just slightly greater than the diameter of the cable core 17.

On the outboard side the bracket 18 is of a reduced, generally rectangular profile as shown in FIG. 3 and is straddled by a pair of flat plate-like limbs 25 of a throttle lever 26. The throttle lever extends laterally away from the handle bars 14 and has a manually engageable terminal portion 27 that is concavely curved along its length as seen in FIG. 2 and also transversely, i.e. at right angles to the plane of FIG. 2, the transverse curvature corresponding to the generally cylindrical curvature of the hand-grip 20. In the region where the limbs 25 join, the throttle lever 26 is formed with a slot 28 which, as shown in FIG. 2, is aligned with the bore 21, and extends generally radially with respect to the handlebars 14, this slot being in a thickened portion of the throttle lever and terminating on its side facing away from the extension 22 of the mounting bracket in a shallow recess 29 that extends transverse to the slot.

The throttle lever 26 is attached to the mounting bracket 18 by interengaging formations thereon that define spaced first and second pivot axes. Specifically, the mounting bracket 18 carries two pairs of spaced pins 30 and 31, each pin of a pair being co-axial and being provided by a set screw 32 in threaded engagement with the mounting bracket 18 and having a portion of its stem surrounded by a short tubular roller 33. The pins 30 and 31 are received in respective pairs of slots 34 and 35 formed in the limbs 25 of the throttle lever, the slots having rounded ends as shown, and each second slot 35 being arcuate about one end of the first slot 34, and each first slot 34 being arcuate about one end of the second slot 35.

In the assembled condition as illustrated in FIG. 2 the bowden cable 15 is installed with the end of its sheath 16 seated in the counterbore 23 and its core 17 extending through the bore 21 and into the slot 28, a transverse toggle 17a attached to the end of the core being received in the recess 29.

FIG. 2 respresents the closed throttle condition of the mechanism, the lever 26 being held in the position shown by the spring load of the throttle closing force acting on the cable core 17. To open the throttle, the driver of the vehicle engages the throttle lever portion 27 with the thumb of the hand which encloses the hand-grip 20, i.e. his right hand. The throttle lever is positioned closely adjacent to the handgrip 20 so that it can easily be manipulated by the thumb while the handgrip 20 is enclosed by the fingers of the right hand. During the initial range of opening movement, the first pin 30 remains in engagement with the end of the slot 34 as shown in FIG. 2, and the throttle lever pivots about this slot end, the second slot 35 (which is arcuate about the above-mentioned slot end) moving past the second pin 31. It will be noted that during this first range of pivotal movement the end of the terminal portion 27 of the throttle lever is about three times more distant from the pivot axis than is the toggle end 17a of the cable core so that the thumb has a mechanical advantage of about 3:1.

Figure 5:
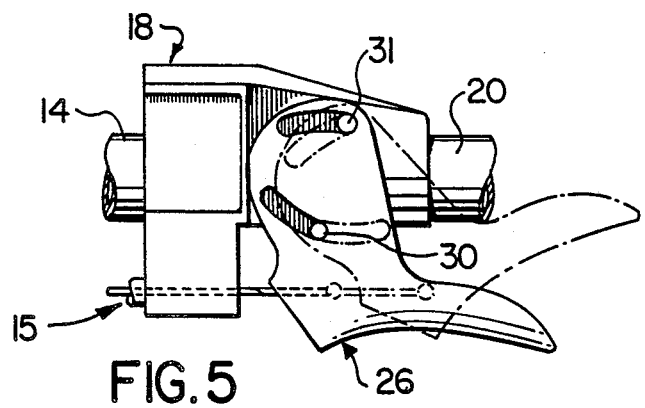
FIG. 5 is a view similar to FIG. 2 but to a smaller scale showing the operation of the throttle lever.

The limit of this first range of pivotal movement is determined by the length of the second slot 35 and terminates when the end of the second slot 35 comes into engagement with the second pin 31, this condition being shown in FIG. 5. At this stage, further force applied to the throttle lever by the operator can effect pivotal movement through a second stage.

In this second stage the pivotal axis is now the second pin 31, and further pivotal movement of the throttle lever can be accommodated by the first slot 34 moving arcuately past the first pin 30, this second stage of movement terminating when the second end of the first slot 34 comes into engagement with the first pin 30, as indicated in broken lines in FIG. 5, in which condition the curved terminal portion 27 of the throttle lever is closely adjacent to the hand grip 20. It will be appreciated that during this second stage of pivotal movement the mechanical advangtage of the operator's effort applied to the terminal portion 27 of the throttle lever over the return force of the cable core 17 is very much reduced, and preferably is less than half the mechanical advantage available during the first stage of pivotal movement.

In a typical application in a snowmobile, the effort required to be applied by an operator to the throttle lever during the first stage is about 2 kg, and in the second stage about 6 to 7 kg. The arrangement is such that throttle openings corresponding to the normal range of cruising speeds of the vehicle fall within the first stage of pivotal movement and accordingly can be maintained for long periods without undue discomfort or fatigue to the driver of the vehicle. A relatively much greater effort is required to be applied by the driver for larger throttle openings, but this greater effort is easily tolerated by the driver since typically it need only be applied for relatively short durations.

I claim:

1. In a vehicle having a steering mechanism that includes handlebars terminating in handgrips for engagement by the driver's hands, a throttle lever being pivotally mounted on a mounting bracket attached to the handlebars and spring loaded towards a closed position, said throttle lever being located adjacent one said handgrip such that when said one handgrip is grasped by the corresponding hand of the driver the thumb of that hand is in position to manipulate the throttle lever away from said closed position and thus control operation of the vehicle engine, the improvement comprising: said throttle lever having a proximal end that is bifurcate and defines two generally parallel limbs that straddle a section of said mounting bracket, and a distal end for engagement by the thumb of the driver, the limbs of said throttle lever and the confronting surfaces of said section of the mounting bracket having interengaging formations thereon that define spaced first and second pivot axes, and said throttle lever being adapted to perform a two stage pivotal movement about said first and second pivot axes respectively, said axes being so located that during a first stage of pivotal movement of said throttle lever about said first axis away from the closed position an actuating force applied by the driver's thumb acts at a greater mechanical advantage than during a second stage of pivotal movement thereof about said second axis.

2. A vehicle according to claim 1 wherein said interengaging formations comprise pins mounted on said mounting bracket, and respective first and second elongate slots in said throttle lever within which slots said pins are received, said second slot being arcuately curved about one end of said first slot and vice versa such that in the closed position the first pin is located at said one end of the first slot and the second pin is located at the other end of the second slot, said first stage of pivotal movement terminating when said one end of the second slot is brought into engagement with said second pin whereupon the second stage of pivotal movement can commence.

3. A vehicle according to claim 2 wherein said first and second slots are duplicated so as to be present in each limb of the throttle lever.

4. A vehicle according to claim 3 wherein each of said first and second pins has two parts that are fixed on opposite sides of said section of the mounting bracket so as to leave said mounting bracket bore unobstructed.

5. A vehicle according to claim 2 wherein said distal end of the throttle lever is convexly curved in the direction transverse to its length so as to enable it to closely approach the handgrip in moving to its fully open position.

6. A vehicle according to claim 1 wherein the mechanical advantage during the first stage of pivotal movement is at least twice as high as during the second stage so that at the transition between the two stages there is an abrupt change in the resistance to pivotal movement perceived by the driver.

7. A vehicle according to claim 1 wherein the movement of the throttle lever is transmitted through a bowden cable having a stranded metal core that is movable longitudinally within a substantially non-compressible flexible sheath, said mounting bracket defining a bore that is generally aligned with the adjacent portion of the handlebars and receives the bowden cable with the core passing therethrough and one end of the sheath seated in a counter bore adjoining said bore, the stranded core extending from said bracket and being fixed at its end to an anchor point in the throttle lever.

8. In a vehicle having a steering mechanism that includes handlebars terminating in handgrips for engagement by the driver's hands, a throttle lever being pivotally mounted on the handlebars and spring loaded towards a closed position, said throttle lever being located adjacent one said handgrip such that when said one handgrip is grasped by the corresponding hand of the driver the thumb of that hand is in position to manipulate the throttle lever away from said closed position and thus control operation of the vehicle engine, the improvement comprising: said throttle lever being adapted to perform a two stage pivotal movement about respective spaced first and second pivot axes that are so located that during a first stage of pivotal movement of said throttle lever about said first axis away from the closed position an actuating force applied by the driver's thumb acts at a greater mechanical advantage than during a second stage of pivotal movement thereof about said second axis; said throttle lever being pivotally connected to a mounting bracket that has a cylindrical bore therein sized to pass over the handlebars, screw clamp means being provided in said mounting bracket to secure it fixedly at a desired location on the handlebars, said throttle lever having a proximal end that is bifurcate to define two parallel plate-like limbs adapted to straddle a section of said mounting bracket and a projecting curved distal end section for engagement by the driver's thumb; and wherein said first and second pivot axes are defined by pins mounted on said mounting bracket, which latter is adapted to be fixedly secured to said handlebars, said pins being received in respective first and second elongate slots in said throttle lever, said second slot being arcuately curved about one end of said first slot and vice versa such that in the closed position the first pin is located at said one end of the first slot and the second pin is located at the other end of the second slot, said first stage of pivotal movement terminating when said one end of the second slot is brought into engagement with said second pin whereupon the second stage of pivotal movement can commence.

9. A vehicle steering mechanism comprising:
handlebars terminating in handgrips for engagement by the driver's hands;
a throttle lever pivotally mounted on a mounting bracket secured on the handlebars, the throttle lever being spring-loaded towards a closed position, said throttle lever being located adjacent one said handgrip such that when said one handgrip is grasped by the corresponding hand of the driver the thumb of that hand is in position to manipulate the throttle lever away from said closed position and thus control operation of the vehicle engine;
spaced first and second pivot axes being defined by pins fixed in said mounting bracket and received in respective first and second elongate slots in said throttle lever, said second slot being arcuately curved about one end of said first slot and vice versa, such that in said closed position of the throttle lever the first pin is located at said one end of the first slot and the second pin is located at the other end of the second slot, said throttle lever being adapted to perform a two stage pivotal movement about said respective spaced first and second pivot axes,
said first stage of pivotal movement terminating when said one end of the second slot is brought into engagement with said second pin whereupon the second stage of pivotal movement can commence;
said axes being so located that during the first stage of pivotal movement of said throttle lever about said first axis away from the closed position an actuating force applied by the driver's thumb acts at a greater mechanical advantage than during the second stage of pivotal movement thereof about said second axis.

10. A vehicle steering mechanism according to claim 9 wherein the mechanical advantage during the first stage of pivotal movement is at least twice as high as during the second stage so that at the transition between the two stages there is an abrupt change in the resistance to pivotal movement perceived by the driver.

11. A vehicle steering mechanism according to claim 9 wherein said distal end of the throttle lever is convexly curved in the direction transverse to its length so as to enable it to closely approach the handgrip in moving to its fully open position.

* * * * *